United States Patent
Esman et al.

(10) Patent No.: US 11,356,173 B2
(45) Date of Patent: Jun. 7, 2022

(54) COMPUTATIONALLY EFFICIENT REAL TIME PHOTONIC CYCLIC AUTOCORRELATION FUNCTION (CAF) ANALYZER DEVICE

(71) Applicant: Rockwell Collins, Inc., Cedar Rapids, IA (US)

(72) Inventors: Daniel J. Esman, Columbia, MD (US); Ronald D. Esman, Mclean, VA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 17/226,436

(22) Filed: Apr. 9, 2021

(65) Prior Publication Data

US 2021/0328669 A1 Oct. 21, 2021

Related U.S. Application Data

(60) Provisional application No. 63/011,858, filed on Apr. 17, 2020.

(51) Int. Cl.
*H04B 10/2575* (2013.01)
*H04B 10/079* (2013.01)

(52) U.S. Cl.
CPC ..... *H04B 10/0793* (2013.01); *H04B 10/2575* (2013.01)

(58) Field of Classification Search
CPC .................................................. H04B 10/2575
See application file for complete search history.

(56) References Cited

U.S. PATENT DOCUMENTS

| | | | |
|---|---|---|---|
| 9,287,993 B1* | 3/2016 | Adleman | H04J 14/0298 |
| 10,411,810 B2 | 9/2019 | Kuo et al. | |
| 10,523,329 B2 | 12/2019 | Esman et al. | |
| 2018/0006730 A1* | 1/2018 | Kuo | H04B 10/615 |
| 2018/0131445 A1* | 5/2018 | Esman | H04B 10/0795 |
| 2019/0149232 A1 | 5/2019 | Heismann | |
| 2019/0339548 A1 | 11/2019 | Ataie | |

* cited by examiner

*Primary Examiner* — Shi K Li
(74) *Attorney, Agent, or Firm* — Suiter Swantz pc llo

(57) ABSTRACT

A computationally efficient real-time photonic cyclic autocorrelation function (CAF) analysis device and method are disclosed. In embodiments, the CAF analyzer generates a photonic carrier which is converted into upper and lower comb signals (comprising a set of N tones) by upper and lower optical frequency comb generators (OFCG), the lower comb signal offset from the upper. An inbound radio frequency (RF) signal is received and modulates the upper and lower comb signals via amplitude modulation. An optical delay line (e.g., ring resonator) introduces a delay into the modulated lower comb signal. The upper and lower comb signals are demultiplexed into their modulated frequency component and sent to a bank of N coherent I/Q receivers, which generate a slice of the CAF for the received RF signal based on the selected delay.

12 Claims, 4 Drawing Sheets

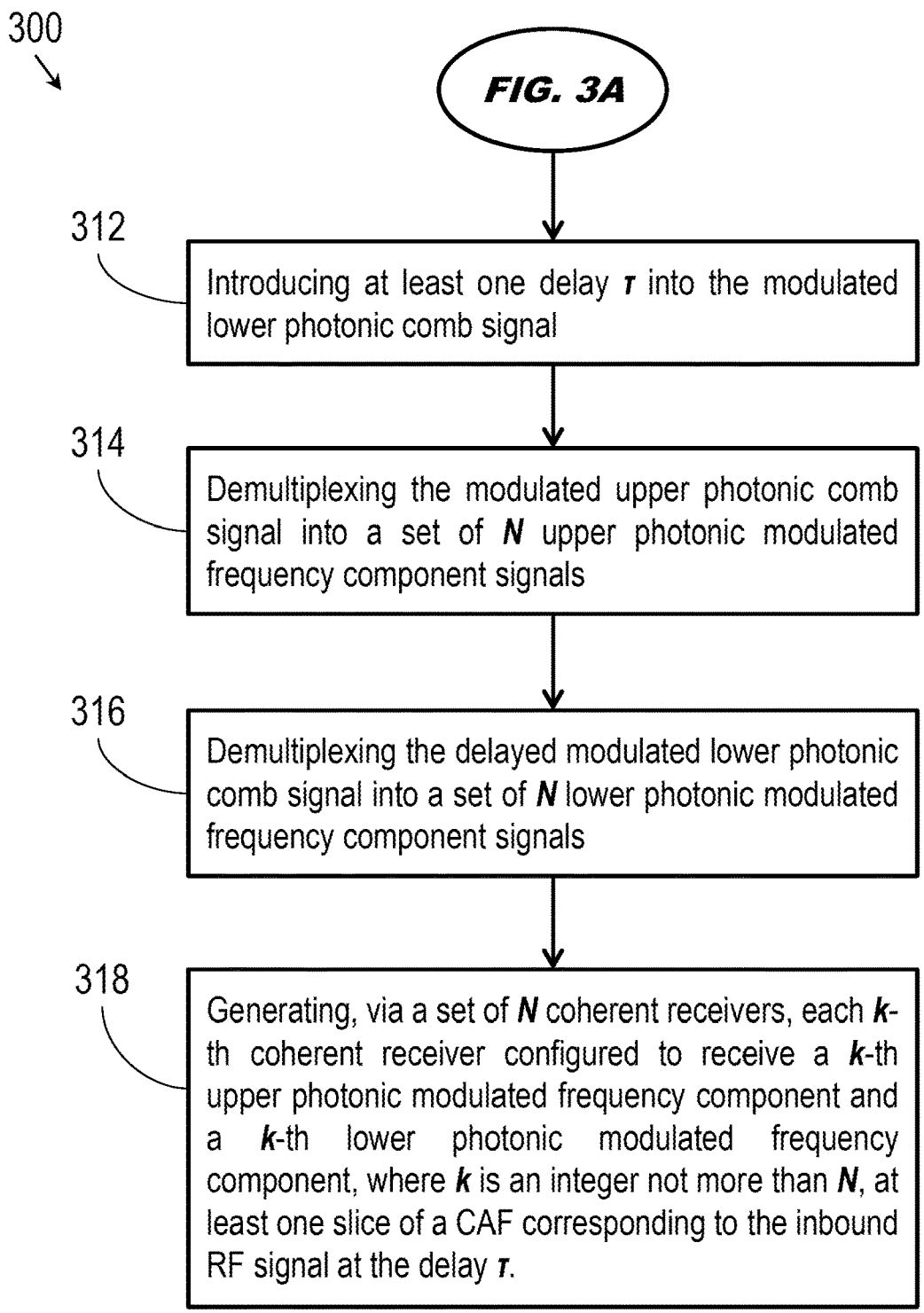

COMPUTATIONALLY EFFICIENT REAL TIME PHOTONIC CYCLIC AUTOCORRELATION FUNCTION (CAF) ANALYZER DEVICE

CROSS-REFERENCE TO RELATED APPLICATIONS

The present application is related to and claims the benefit of the earliest available effective filing dates from the following listed applications (the "Related Applications") (e.g., claims earliest available priority dates for other than provisional patent applications (e.g., under 35 USC § 120 as a continuation in part) or claims benefits under 35 USC § 119(e) for provisional patent applications, for any and all parent, grandparent, great-grandparent, etc. applications of the Related Applications).

RELATED APPLICATIONS

U.S. Provisional Patent Application Ser. No. 63/011,858 entitled COMPUTATIONALLY FREE REAL TIME PHOTONIC CYCLIC AUTOCORRELATION FUNCTION (CAF) ANALYZER DEVICE, filed Apr. 17, 2020;

Said U.S. Provisional Patent Application 63/011,858 is herein incorporated by reference in its entirety.

TECHNICAL FIELD

The subject matter disclosed herein is directed generally to receiver systems and more particularly to photonic-driven systems for analyzing received signals.

BACKGROUND

Robust intelligence, surveillance, and reconnaissance (ISR) applications require access to, and understanding of, the congested and contested radio frequency (RF) spectrum. In particular, exploiting second-order cyclostationarity (SOCS) allows not only for signals to be detected but for external "fingerprints" of the signal (e.g., modulation type and shape, geolocation, transmitting equipment) to be derived via, for example, a cyclic autocorrelation function (CAF) of the signal. However, SOCS analysis and processing can come at a high cost in terms of computation time, latency, and resolution. For example, conventional CAF estimators require an analog-digital converter (ADC) up front, which limits the resolution of capture, and fast digital signal processing (DSP) to compute the CAF. Further, CAF estimators require a high degree of latency at the terminal end for fast Fourier transform (FFT) computations.

SUMMARY

In a first aspect, a receiver apparatus configured for computationally efficient real-time photonic cyclic autocorrelation function (CAF) analysis is disclosed. In embodiments, the receiver apparatus includes a master laser or similar photonic source for generating a photonic carrier split into upper and lower optical paths. The receiver apparatus includes upper and lower optical frequency comb generators (OFCG) for generating upper and lower comb signals each comprising N frequency tones, each adjacent pair of upper frequency tones pitched by $\Delta f$ and each adjacent pair of lower frequency tones pitched by $\Delta f+\delta f$. The receiver apparatus includes antenna elements for receiving inbound radio frequency (RF) signals. The receiver apparatus includes upper and lower electrooptical amplitude modulators for modulating the upper and lower comb signals according to the received inbound RF signal. The receiver apparatus includes an optical delay line in the lower optical path, for introducing a delay r into the modulated lower optical comb signal. The receiver apparatus includes upper and lower arrayed waveguide gratings (AWG) or similar optical demultiplexers for splitting the modulated upper comb signal and delayed modulated lower comb signal into their respective N frequency component signals. The receiver apparatus includes a set of N coherent receivers for providing in-phase and quadrature (I/Q) optical field components, each coherent receiver conjugating the delayed modulated lower comb signal by multiplying the two counterpart modulated frequency component signals from the upper and lower paths and integrating the product to generate broadband slices of the CAF corresponding to the inbound RF signal and to the delay $\tau$.

In some embodiments, the upper and lower optical comb signals are respectively imposed on upper and lower photonic carriers generated by splitting a photonic carrier generated by the photonic source via optical coupler.

In some embodiments, the optical delay line includes a recirculating delay line for introducing a set of T delays $(\tau_1, \ldots \tau_T)$ into the modulated lower optical comb signal, such that the set of N coherent receivers generates a sum of the CAF over the set of T delays.

In some embodiments, the recirculating delay line includes a feedback structure or ring resonator.

In some embodiments, the optical delay line includes a non-recirculating delay line for introducing a set of T delayed optical signal copies (e.g., where each signal copy corresponds to a delay $\tau_1, \ldots \tau_T$) into the modulated lower comb signal, such that the set of N coherent receivers generates a sum of the CAF over the set of T delays.

In some embodiments, the non-recirculating delay line includes a ladder network, a lattice, and/or a feed-forward structure.

In a further aspect, a method for computationally efficient real-time CAF analysis of a received RF signal is also disclosed. In embodiments, the method includes receiving, via antenna elements, inbound RF signals. The method includes generating, via a master laser or like photonic source, a photonic carrier (and splitting the photonic carrier into upper and lower optical paths). The method includes generating, via upper and lower optical frequency comb generators (OFCG) in the upper and lower optical paths respectively, upper and lower photonic comb signals comprising a set of N frequency tones, the frequency tones of the upper photonic comb signal pitched in frequency by $\Delta f$ and the frequency tones of the lower photonic comb signal pitched in frequency by $\Delta f+\delta f$. The method includes modulating the upper and lower photonic comb signals according to the received inbound RF signal. The method includes introducing a delay r into the modulated lower photonic comb signal. The method includes demultiplexing the modulated upper photonic comb signal and the delayed modulated lower photonic comb signal into their respective N modulated frequency component signals. The method includes generating, via a set of N coherent in-phase/quadrature (I/Q) receivers, slices of the CAF corresponding to the inbound RF signal and to the delay $\tau$, based on each k-th coherent receiver multiplying a k-th upper photonic modulated frequency component signal and a counterpart k-th lower photonic modulated frequency component signal and integrating the product.

In some embodiments, the method includes splitting the photonic carrier into upper and lower carriers, the upper photonic comb signal based on the upper carrier and the lower photonic comb signal based on the lower carrier.

In some embodiments, the method includes introducing a set of T delays ($\tau_1, \ldots \tau_T$) into the modulated lower photonic comb signal.

In some embodiments, the method includes introducing the set of T delays into the modulated lower photonic comb signal via a recirculating delay line (e.g., a ring resonator and/or feedback structure).

In some embodiments, the method includes introducing the set of T delays into the modulated lower photonic comb signal via a non-recirculating delay line (e.g., a feed-forward structure, lattice, and/or ladder structure).

In some embodiments, the method includes generating, via the set of N coherent receivers, a summation of the CAF over the set of T delays (e.g., over the delay axis of the CAF).

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIGS. 3A and 3B are flow diagrams illustrating a method for real-time photonic CAF analysis in accordance with example embodiments of this disclosure.

DETAILED DESCRIPTION

Figure 1:
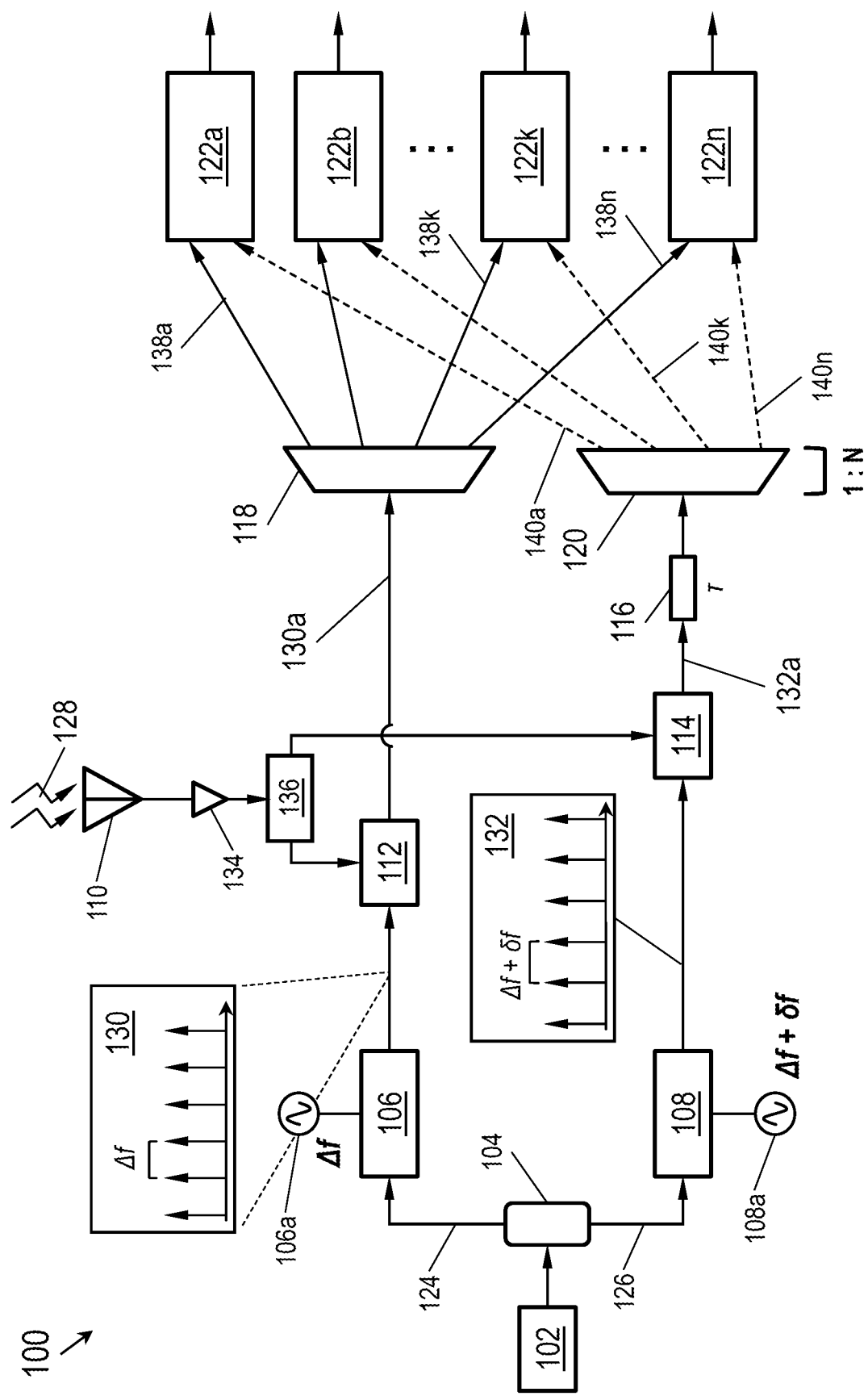
FIG. 1 is a block diagram illustrating a real-time photonic cyclic autocorrelation function (CAF) analyzer in accordance with example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Referring to FIG. 1, a real-time photonic cyclic autocorrelation function (CAF) analyzer 100 is disclosed. The real-time photonic CAF analyzer 100 may include a master laser 102, coupler 104, optical frequency comb generators 106, 108 (OFCG), antenna element/s 110, amplitude modulators 112, 114, optical delay line 116, arrayed waveguide gratings 118, 120 (AWG), and a set of N in-phase/quadrature (I/Q) coherent receivers 122a, 122b, ... 122k ... 122n (e.g., coherent detectors). Components of the real-time photonic CAF analyzer 100 may be connected, e.g., by fiber, waveguide, or other appropriate optical media, into upper and lower optical paths 124, 126.

In embodiments, the real-time photonic CAF analyzer 100 may provide for high-resolution, low-latency, real-time or near-real time generation of broadband slices of the CAF of a given inbound radio frequency (RF) signal 128 without the need for any complex electronic computations (e.g., Fourier transforms, correlations, etc.). The bandwidth of the inbound RF signal 128 may be limited only by the bandwidth of the amplitude modulators 112, 114. Similarly, system-wide latency may be proportional to the length of optical fibers or other optical media (e.g., upper and lower optical paths 124, 126) connecting the components of the real-time photonic CAF analyzer 100.

In embodiments, the real-time photonic CAF analyzer may generate a photonic (e.g., optical) carrier (e.g., at an angular frequency ω) via the master laser 102 (e.g., or any appropriate like photonic signal source). The optical coupler 104 (e.g., 3 dB) may split the photonic carrier into upper and lower copies, each copy defining an upper or lower branch (e.g., upper and lower optical paths 124, 126) of the analyzer. Based on this split photonic carrier, the upper and lower OFCGs 106, 108 (e.g., Vernier offset optical frequency combs, including signal generators 106a, 108a) may respectively generate upper and lower comb signals 130, 132. For example, the upper comb signal 130 may comprise a set of N frequency tones (where N is an integer) pitched in frequency by $\Delta f$ (e.g., per signal generator 106a, each consecutive pair of frequency tones is separated by $\Delta f$). Similarly, the lower comb signal 132 may comprise a set of N frequency tones offset by $\delta f$ in frequency pitch relative to the upper comb signal 130 (e.g., per signal generator 108a, each consecutive pair of lower frequency tones is separated by $\Delta f + \delta f$).

In embodiments, the antenna elements 110 receive the inbound RF signal 128. For example, the real-time photonic CAF analyzer 100 may include RF amplifiers 134, RF splitters 136, and other signal processing equipment for handling the inbound RF signal 128 and providing a copy to the upper and lower amplitude modulators 112, 114. The upper and lower amplitude modulators 112, 114 may respectively modulate the upper comb signal 130 and the lower comb signal 132 according to the inbound RF signal 128. In embodiments, the optical delay line 116 may introduce a delay $\tau$ into the modulated lower comb signal 132a.

In embodiments, the AWG 118, 120 (e.g., or any other appropriate optical demultiplexer) may respectively demultiplex (demux) the modulated upper comb signal 126a and the delayed modulated lower comb signal 132a into its N modulated frequency components (e.g., comb lines; previously, frequency tones) 138a ... 138n, 140a ... 140n. For example, each k-th coherent receiver 122k of the N coherent receivers 122a-n may receive a component frequency 138k of the modulated upper comb signal 130a and its counterpart component frequency 140k of the delayed modulated lower comb signal 132a.

In embodiments, the N coherent receivers 122a-n are implemented to provide the in-phase and quadrature component of the optical field, as is known in the art. For example, each k-th coherent receiver 122k of the N coherent receivers 122a-n may conjugate the delayed modulated lower comb signal 132a, multiplying the modulated frequency component 140k by its counterpart modulated frequency component 138k from the modulated upper comb signal 130a, integrating the product to generate a broadband slice of the cyclic autocorrelation function (CAF) corresponding to the RF signal at the introduced delay r and having a bandwidth and resolution $\delta f$ and relative frequency $(k-N/2) \delta f$ (e.g., where N is the number of coherent receivers 122a-n as well as the number of component frequency tones within the upper and lower comb signals 130, 132, and $\delta f$ is the frequency offset pitch between the upper and lower comb signals). For example, the CAF at delay $\tau$ of a signal $x(t)$ may be defined as:

$$R_x^\alpha(\tau) \lim_{T \to \infty} \frac{1}{T} \int_{-T/2}^{T/2} x\left(t+\frac{\tau}{2}\right) x^*\left(t-\frac{\tau}{2}\right) e^{-j2\pi\alpha t} dt$$

and, in embodiments, the simplified upper optical signal field $s_k(t)$ on the k-th coherent detector 122k (e.g., based on the modulated frequency component 138k of the modulated upper comb signal 130a may be:

$$s_k(t) = x(t) e^{j(\omega + 2\pi k \Delta f)t}$$

(for modulated signal $x(t)$ and ML (e.g., master laser 102) frequency $\omega$). Similarly, the simplified lower optical field $r_k(t)$ on the k-th coherent detector 122k (e.g., based on the modulated frequency component 140k from the delayed modulated lower comb signal 132a) may be:

$$r_k(t) = x(t-\tau) e^{j(\omega + 2\pi k \Delta f + 2\pi k \delta f)(t-\tau)}$$

(for delay $\tau$ introduced by the optical delay line 116). Accordingly, the output of the k-th coherent detector 122k, based on the above two fields $s_k(t)$ and $r_k(t)$, may be:

$$\frac{1}{T}\int_{-T/2}^{T/2} s_k(t) r_k^*(t) dt = \frac{1}{T}\int_{-T/2}^{T/2} x(t) x^*(t-\tau) \varphi(\tau,\omega) e^{-j2\pi k \delta f t} dt \approx R_x^{k\delta f}(\tau)$$

(for T inversely proportional to the bandwidth of the receiver, e.g., the real-time photonic CAF analyzer 100, and $\varphi$, e.g., a phase-only term capable of being calibrated out). The narrowband nature of the outputs from each coherent receiver 122a-n provides for high resolution analog-digital conversion (ADC) captures, e.g., 10 effective number of bits (ENOB) or greater.

Figure 2:
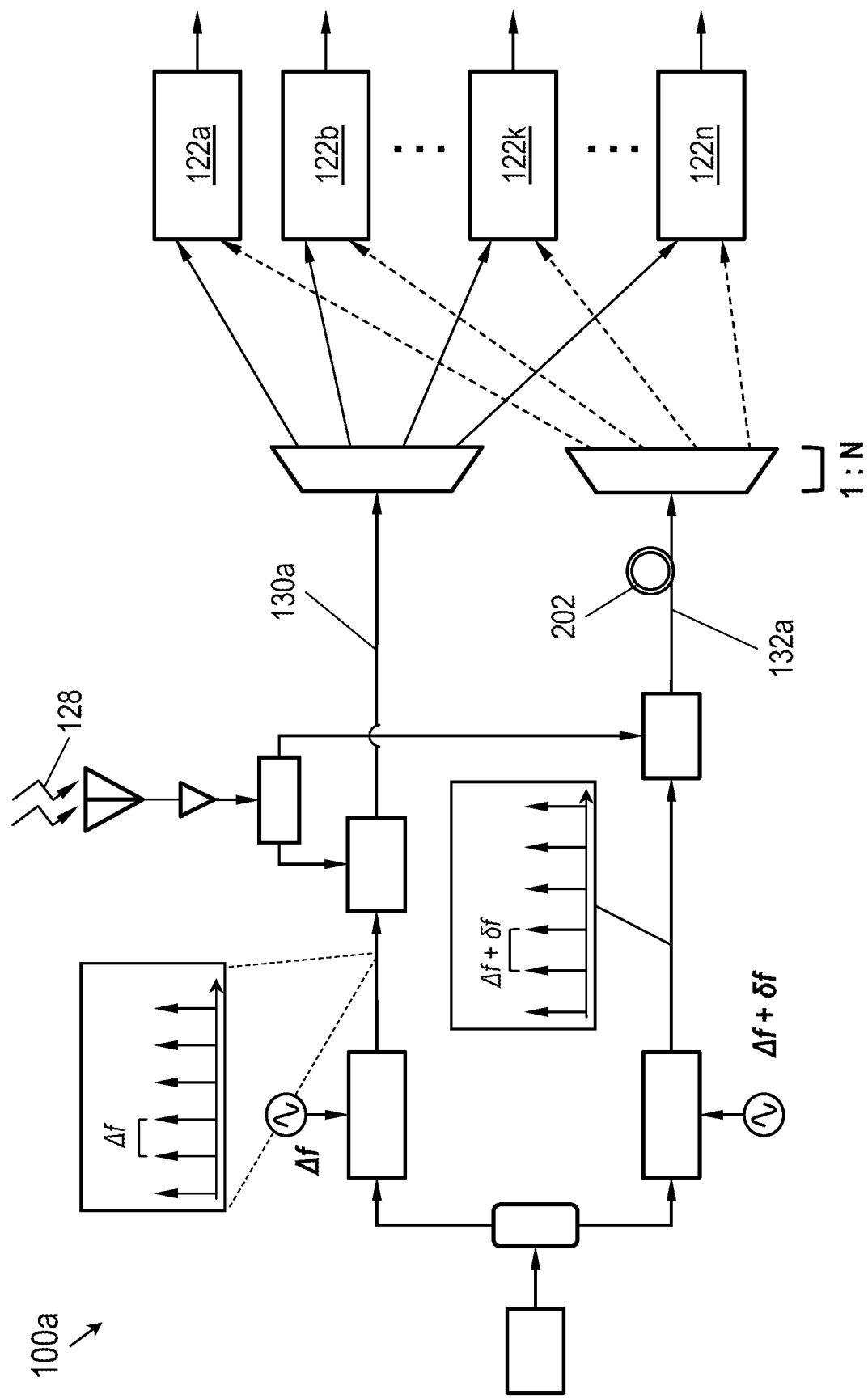
FIG. 2 is a block diagram illustrating the real-time photonic CAF analyzer of FIG. 1 incorporating a ring resonator.

Referring to FIG. 2, the real-time photonic CAF analyzer 100a may be implemented and may function similarly to the real-time CAF analyzer 100 of FIG. 1, except that the real-time photonic CAF analyzer 100a may incorporate an optical signal replicator 202 with delay capable of introducing a set of delayed signal copies and therefore capable of implementing all delays of the CAF. For example, the optical signal replicator 202 may include a recirculating delay line, e.g., a ring resonator or other feedback structure. Alternatively, the optical signal replicator may include a non-recirculating delay line, e.g., a ladder network, lattice, or other feed-forward structure. Accordingly, the real-time photonic CAF analyzer 100a may process, in real time, all delays of the CAF for a given inbound RF signal 128, summing the full CAF over the delay axis.

In embodiments, the optical signal replicator 202 may implement a repetitive delay into the RF-modulated lower comb signal 132a. For example, the repetitive delay may correspond to a set of n delays $\tau_1 \ldots \tau_n$ such that a current pulse and any previous p pulses (p<n) beat with the RF-modulated upper comb signal 130a at any given time.

In embodiments, for the CAF $R_x^\alpha(\tau)$ and simplified optical signal field $s_k(t)$ as disclosed above with respect to the real-time photonic CAF analyzer 100 of FIG. 1, the simplified lower optical field on each k-th coherent detector 122k of the real-time photonic CAF analyzer 100a may be:

$$r_k(t) = \sum_n x(t-\tau_n) e^{j(\omega + 2\pi k \Delta f + 2\pi k \delta f)(t-\tau_n)}$$

for each delay $\tau_n$ of the set of n delays $\tau_1 \ldots \tau_n$. Accordingly, the output of the k-th coherent detector 122k may be:

$$\frac{1}{T}\int_{-T/2}^{T/2} s_k(t) r_k^*(t) dt = $$
$$\frac{1}{T}\sum_n \int_{-T/2}^{T/2} x(t) x^*(t-\tau_n) \varphi(\tau_n,\omega) e^{-j2\pi k \delta f t} dt \approx \sum_n R_x^{k\delta f}(\tau_n)$$

and the low-latency, real-time output of the coherent detectors 122a-n may correspond to the CAF for the received inbound RF signal 128 summed over the set of n delays $\tau_1 \ldots \tau_n$.

Figure 3A:
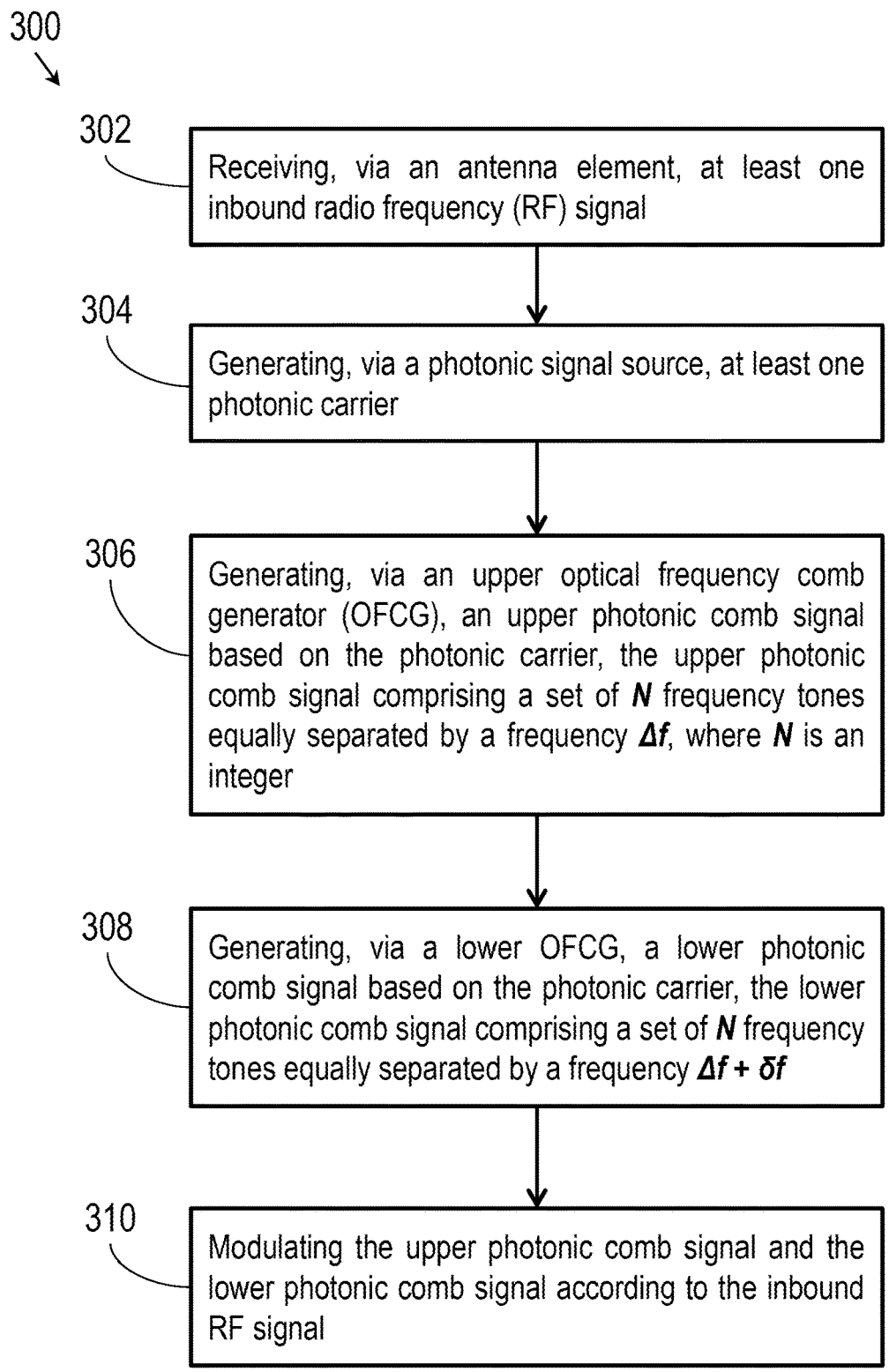

Referring to FIG. 3A, the method 300 may be implemented by the real-time photonic CAF analyzer devices 100, 100a and may incorporate the following steps.

At a step 302, a receiver embodying the real-time photonic CAF analyzer receives an inbound radio frequency (RF) signal, e.g., via antenna elements thereof.

At a step 304, a master laser or other photonic signal source generates a photonic carrier.

At a step 306, an upper optical frequency comb generator (OFCG) generates, based on the photonic carrier, an upper photonic comb signal comprising a set of N frequency tones separated by a frequency $\Delta f$.

At a step 308, a lower OFCG generates, based on the photonic carrier, a lower photonic comb signal comprising the set of N frequency tones but offset by $\delta f$ relative to the frequency tones of the upper photonic comb signal. For example, with respect to the steps 306, 308, the photonic carrier may be split by an optical coupler into an upper copy and a lower copy, the upper photonic comb signal and the lower photonic comb signal respectively based on the upper and lower copies of the photonic carrier.

At a step 310, upper and lower amplitude modulators respectively modulate the upper and lower photonic comb signals based on the received inbound RF signal.

Referring now to FIG. 3B, at a step 312 an optical delay line introduces a delay $\tau$ into the modulated lower photonic comb signal. In some embodiments, an optical signal replicator may introduce a set of delayed signal copies corresponding to a set of n delays $\tau_1 \ldots \tau_n$ into the lower photonic comb signal. For example, the optical signal replicator may be a recirculating delay line, e.g., a ring resonator or other feedback structure. In some embodiments, the optical signal replicator may be a non-recirculating delay line, e.g., a ladder network, lattice, or feed-forward structure.

At a step 314, arrayed waveguide gratings (AWG) demultiplex the modulated upper photonic comb signal into a set of N modulated frequency component signals.

At a step 316, AWGs similarly demultiplex the delayed modulated lower photonic comb signal into a set of N component frequency tone signals.

At a step 318, each k-th coherent receiver of a set of N coherent receivers receives both the k-th modulated frequency component signal of the upper photonic comb signal, and the k-th modulated frequency component signal of the delayed lower photonic comb signal, multiplying and integrating the two received signals to generate a slice of the CAF corresponding to the received RF signal at the introduced delay $\tau$. In some embodiments, the set of N coherent receivers generates a sum of the CAF over the set of n introduced delays $\tau_1 \ldots \tau_n$.

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. A real-time photonic cyclic autocorrelation function (CAF) analyzer device, comprising:
   at least one photonic signal source configured to generate a photonic carrier;
   an upper optical frequency comb generator (OFCG) and a lower OFCG optically coupled to the photonic signal source,
   the upper OFCG configured to generate, based on the photonic carrier, an upper optical comb signal comprising N upper frequency tones, where N is an integer,
   and
   the lower OFCG configured to generate, based on the photonic carrier, a lower optical comb signal comprising N lower frequency tones offset from the N upper frequency tones by a frequency $\delta f$;
   at least one antenna element configured to receive an inbound radio frequency (RF) signal;
   an upper and lower electro-optical amplitude modulator respectively optically coupled to the upper OFCG and the lower OFCG and communicatively coupled to the at least one antenna element, the upper and lower electro-optical amplitude modulators configured to respectively modulate the upper optical comb signal and the lower optical comb signal according to the inbound RF signal;
   at least one optical delay line optically coupled to the lower electro-optical amplitude modulator, the optical delay line configured to introduce a delay $\tau$ into the modulated lower optical comb signal;
   an upper optical demultiplexer (demux) optically coupled to the upper electro-optical amplitude modulator, the upper optical demux configured to split the modulated upper optical comb signal into a set of N upper modulated frequency component signals;
   a lower optical demux optically coupled to the optical delay line, the lower optical demux configured to split the modulated lower optical comb signal into a set of N lower modulated frequency component signals;
   and
   a set of N coherent receivers optically coupled to the upper and lower optical demuxes,
   each k-th coherent receiver of the set of N coherent receivers, where k is an integer not more than N, configured to:
   receive the k-th upper modulated frequency component signal and the k-th lower modulated frequency component signal;
   and
   generate, based on the received upper and lower modulated frequency component signals, a slice of a cyclic autocorrelation function (CAF) corresponding to the inbound RF signal, the slice corresponding to the delay $\tau$.

2. The real-time photonic CAF analyzer device of claim 1, wherein:
   the upper optical comb signal is based on an upper photonic carrier;

the lower optical comb signal is based on a lower photonic carrier;

and the upper photonic carrier and the lower photonic carrier are generated from the photonic carrier by an optical coupler in communication with the photonic signal source.

3. The real-time photonic CAF analyzer device of claim 1, wherein:

the at least one optical delay line includes at least one recirculating delay line configured to introduce a set of T delays into the modulated lower optical comb signal, where T is an integer;

and the set of N coherent receivers is configured to generate a sum of the CAF over the set of T delays.

4. The real-time photonic CAF analyzer device of claim 3, wherein the recirculating delay line is selected from a group including a feedback structure and a ring resonator.

5. The real-time photonic CAF analyzer device of claim 1, wherein:

the at least one optical delay line includes at least one non-recirculating delay line configured to introduce a set of T delayed optical signal copies, each optical signal copy corresponding to a delay of a set of T delays, into the modulated lower optical comb signal, where T is an integer;

and the set of N coherent receivers is configured to generate a sum of the CAF over the set of T delays.

6. The real-time photonic CAF analyzer device of claim 5, wherein the non-recirculating delay line is selected from a group including a ladder network, a lattice, and a feedforward structure.

7. A method for real-time cyclic autocorrelation function (CAF) analysis of a received signal, the method comprising:

receiving, via an antenna element, at least one inbound radio frequency (RF) signal;

generating, via a photonic signal source, at least one photonic carrier;

generating, via an upper optical frequency comb generator (OFCG), an upper photonic comb signal based on the photonic carrier, the upper photonic comb signal comprising a set of N frequency tones equally separated by a frequency $\Delta f$, where N is an integer;

generating, via a lower OFCG, a lower photonic comb signal based on the photonic carrier, the lower photonic comb signal comprising a set of N frequency tones equally separated by a frequency $\Delta f + \delta f$, modulating the upper photonic comb signal and the lower photonic comb signal according to the inbound RF signal;

introducing at least one delay $\tau$ into the modulated lower photonic comb signal;

demultiplexing the modulated upper photonic comb signal into a set of N upper photonic modulated frequency component signals;

demultiplexing the delayed modulated lower photonic comb signal into a set of N lower photonic modulated frequency component signals;

and generating, via a set of N coherent receivers, each k-th coherent receiver configured to receive a k-th upper photonic modulated frequency component signal and a k-th lower photonic modulated frequency component signal, where k is an integer not more than N, at least one slice of a CAF corresponding to the inbound RF signal at the delay $\tau$.

8. The method of claim 7, wherein:

generating, via a photonic signal source, at least one photonic carrier, includes splitting the photonic carrier into an upper carrier and a lower carrier;

generating, via an upper OFCG, an upper photonic comb signal based on the photonic carrier includes generating the upper photonic comb signal based on the upper carrier;

and generating, via a lower OFCG, a lower photonic comb signal based on the photonic carrier includes generating the lower photonic comb signal based on the lower carrier.

9. The method of claim 7, wherein introducing at least one delay $\tau$ into the modulated lower photonic comb signal includes:

introducing, via at least one optical signal replicator, a set of T delays $\tau_1 \ldots \tau_T$ into the modulated lower photonic comb signal.

10. The method of claim 9, wherein introducing, via at least one optical signal replicator, a set of T delays $\tau_1 \ldots \tau_T$ into the modulated lower photonic comb signal includes:

introducing, via at least one recirculating delay line, a set of T delays $\tau_1 \ldots \tau_T$ into the modulated lower photonic comb signal.

11. The method of claim 9, wherein introducing, via at least one optical signal replicator, a set of T delays $\tau_1 \ldots \tau_T$ into the modulated lower photonic comb signal includes:

introducing, via at least one non-recirculating delay line, a set of T delays $\tau_1 \ldots \tau_T$ into the modulated lower photonic comb signal.

12. The method of claim 9, wherein generating, via a set of N coherent receivers, each k-th coherent receiver configured to receive a k-th upper photonic modulated frequency component signal and a k-th lower photonic modulated frequency component signal, where k is an integer not more than N, at least one slice of a CAF corresponding to the inbound RF signal at the delay $\tau$, includes:

generating, via the set of N coherent receivers, a summation of the CAF over the set of T delays $\tau_1 \ldots \tau_T$.

* * * * *